United States Patent [19]

Perkins

[11] Patent Number: 5,248,414

[45] Date of Patent: Sep. 28, 1993

[54] FILTER HAVING IMPROVED MEANS OF POSITIVE SHUTOFF INCORPORATING SLEEVE VALVE SEAT

[75] Inventor: Carl R. Perkins, Wagoner County, Okla.

[73] Assignee: Facet International, Inc., Tulsa, Okla.

[21] Appl. No.: 870,876

[22] Filed: Apr. 20, 1992

[51] Int. Cl.⁵ .................... B01D 35/147; B01D 29/11
[52] U.S. Cl. ................... 210/100; 210/109; 210/489; 210/430
[58] Field of Search ............ 210/100, 109, 315, 317, 210/388, 489, DIG. 17, 446; 137/456, 459, 460, 519.5, 549, 461, 429, 430; 251/333, 334, 363-365

[56] References Cited

U.S. PATENT DOCUMENTS

| | | | |
|---|---|---|---|
| 3,339,734 | 9/1967 | Kasten | 210/96 |
| 3,478,881 | 11/1969 | Bozek | 210/100 |
| 3,766,940 | 10/1973 | Mason | 137/460 |
| 4,364,825 | 12/1982 | Conner, Jr. | 210/109 |
| 4,485,011 | 11/1984 | Cole et al. | 210/96.1 |
| 4,787,949 | 11/1988 | Cole et al. | 156/222 |
| 4,959,141 | 9/1990 | Anderson | 210/109 |
| 4,992,166 | 2/1991 | Lowsky et al. | 210/DIG. 17 |

Primary Examiner—Joseph W. Drodge
Attorney, Agent, or Firm—Head & Johnson

[57] ABSTRACT

A filter having improved means of positive shutoff employs a rigid tubular fuel pervious core surrounded by flexible filter media that intercepts and resists the passage of particulate matter and water. A tubular retention sleeve is positioned within and in closed communication with the tubular core at one end thereof, the retention sleeve having an integral ball retention portion of reduced internal diameter. An end cap is secured to the other end of the tubular core member and has an annular sealing surface surrounding a flow passageway opening therethrough. A ball is normally positioned within the retention sleeve and in the engagement with the circumferential ball retention seat. When the flexible filter media has absorbed a sufficient quantity of water the pressure differential across the ball forces it to pass through the retention seat and to lodge against the sealing surface of the end cap, thereby closing further flow through the filter.

9 Claims, 1 Drawing Sheet

FILTER HAVING IMPROVED MEANS OF POSITIVE SHUTOFF INCORPORATING SLEEVE VALVE SEAT

BACKGROUND OF THE INVENTION

Fuel, such as jet fuel, diesel fuel and the like is seriously impaired if water becomes admixed with it. That is, most uses of fuel such as jet fuel, diesel fuel and so forth, such as in internal combustion engines, are very seriously affected by the presence of water in the fuel. First, of course, water is not combustible, and therefore, subtracts from the energy value available from a given quantity of fuel. Second, water freezes easily and can block fuel lines in cold environments. Third, water tends to carry with it contaminants and more readily reacts with metals to form rust. For these and other reasons, it is very important that in order to preserve high fuel quality water be prevented from traveling in a fuel flow system.

A known expedient to intercept water in a fuel system is to provide a filter media of the type which permits fuel, such as jet fuel, diesel fuel or the like, to pass therethrough but which resists the passage of water. Filters of this type include hydrophilic materials which absorb and expand in the presence of water, but which are not olefinic, that is, which do not absorb hydrocarbons. This type of filter media is useful in blocking the flow of water since the absorption and expansion can serve to close the filter media against the passage of fluid therethrough.

The use of a water absorbent filter media alone as a means of preventing the passage of water in a fuel flow system, however, is not sufficiently dependable. Instead, it is highly desirable that in a fuel flow filtering system a positive shutoff be provided so that when sufficient water is detected in a fuel flow system, such as by water absorbent fuel media swelling or otherwise reacting to resist the further fluid flow therethrough, a positive, mechanical type shutoff be obtained. U.S. Pat. No. 4,485,011 to Cole et al discloses a type of shutoff valve in conjunction with a fuel filter arrangement. In the device of the Cole et al patent a ball is maintained in a rest position as long as the pressure drop across a filter media is below a certain level, but is displaced when the pressure drop increases, such as occurs when the filter media absorbs water. The displaced ball is then passed to a valve closure position to stop further fluid flow through the filter.

The present disclosure is directed towards an improvement in the basic concept of Cole et al U.S. Pat. No. 4,485,011. More particularly, this disclosure provides a structure for controlling the position of a shutoff ball within a fuel filter. Therefore, this disclosure provides a fuel filter having improved means of preventing water and particulate contaminant from passing therethrough.

The filter includes an open end for effluent fuel through flow and a closed end with a bored pressure port sealed by a valve ball. A rigid, tubular, fluid pervious member formed of a stiff plastic and made up of radial and longitudinal ribs is positioned within the filter. The tubular member is affixed in sealed relationship to opposed first and second end caps that are each formed of an injection molded fiber glass/plastic compound. The second end cap is affixed in a manner so as to provide closed communication with a fuel outlet opening in a cartridge plate of a pressure vessel. The filter is normally oriented so that the first end cap may be termed an "upper" end cap and the second end cap a "lower" end cap. While this is the preferred orientation, the filter will function in other orientations.

A tightly wrapped filter media is secured circumferentially around the outer tubular surface of the rigid tubular member and encased in a synthetic sock material. The fuel flows to a filter through a fuel inlet opening of a pressure vessel. The fuel then flows through the synthetic sock and the wrapped filter media and then proceeds into the interior of the fuel pervious rigid tubular member and out the bottom through the openings in the second end cap. The filter media serves to entrap particulate matter, and, in addition, the filter media used in the filter of this disclosure has the characteristics of entrapping water to thereby resist the flow of water through the filter. Further, the filter media is such that as water is entrapped further flow of all fluids through the filter media is resisted. It can be seen that as water is trapped, the pressure drop required to force fluid through the filter media increases at a rate directly proportional to the quantity of water intercepted by the filter media.

A tubular retention sleeve having an opening therethrough and having a modified inside diameter is concentrically affixed to the first end cap and extends down a short distance through the rigid tubular member. This mechanism is positioned upstream or opposite the second end cap. Positioned internal to the cylindrical sleeve, initially in a free floating state, is a ball formed of plastic material. When fuel flow is introduced to the filter, differential pressure will seat the ball within the modified inside diameter of the tubular sleeve. The ball is held in normal engagement with the sleeve so as to prevent fuel flow therethrough. The tubular retention sleeve is of a deformable material, such as aluminum or stiff plastic.

At the opposite end the fuel outlet end, the filter media and tubular member are affixed to the second end cap. The second end cap is formed in such a manner as to provide an annular seal for the ball to seal against.

As hydrocarbon fuel, such as jet fuel or diesel fuel, flows through the filter, the filter media intercepts any entrained particulate matter. The pressure drop across the filter does not significantly increase as long as the fluid flowing is substantially all hydrocarbon fuel. However, any water that is commingled with the fuel is entrapped or absorbed by the filter media. This action restricts further fluid flow through the filter. As more water is absorbed, the pressure differential necessary for further fuel to pass therethrough increases. When this pressure differential develops above a preselected level, the pressure differential across the ball forces the sleeve to deform and pass through the tubular retention sleeve. The ball then enters into the interior of the rigid tubular member and passes to the opposite end thereof where it encounters the circumferential sealing surface within the second end cap. This results in blockage of all further flow through the filter.

A significant improvement of the present invention is the initial free floating position of the valve ball. This condition eliminates any requirement of a predetermined or prepressed condition within the inside diameter of ball retainer thus eliminating the possibility of error by human factor. Sizing of the ball retention seat at the closed end of the retention sleeve can be based on acceleration generated by fluid flow (GPM) relative to the diameter of the ball retention seat and the deformation factor of the retention sleeve.

For another prior art showing of a fuel filter with positive water shutoff see U.S. Pat. No. 4,959,141 issued to Robert D. Anderson on Sep. 25, 1990.

SUMMARY OF THE INVENTION

This invention is an improved filter having means for positive shutoff and more particularly is a fuel filter having improved means of shutting off further fuel flow after a quantity of particulate matter and water have been absorbed by the filter.

The filter is formed of a rigid tubular fuel pervious core member—that is, a perforated tube preferably of plastic having a first end and a second end. A first end cap is affixed to the core first end and a second end cap is secured to the tubular core member at the second end thereof. The filter is preferably operated in an upright position so that the first end cap is an upper end cap and the second end cap is a lower end cap, but the filter is not limited to this preferred orientation.

Flexible filter media surrounds the tubular core member through which fuel freely passes from the exterior thereof and into the interior of the tubular core member. The flexible filter media is of the type which freely passes fuel therethrough but which intercepts particulate matter and which absorbs water. That is, the flexible filter media resists the passage of water.

Supported within and in closed communication with the blind end cap is a tubular retention sleeve. The retention sleeve has an integral circumferential ball retention seat of reduced internal diameter.

A ball is normally received within the tubular retention sleeve. The ball is preferably of a diameter slightly less than the interior diameter of the retention sleeve so that the ball is snugly but movably positioned within the retention sleeve and in engagement with the circumferential seat of the retention sleeve so as to prevent the flow of fluid through the retention sleeve.

The retention sleeve is radially outwardly expandable to permit the ball to pass the retention seat when sufficient differential pressure exists across the ball—that is, when the flexible filter material has absorbed sufficient water as to resist further fuel flow. When the ball is passed through the retention sleeve it moves to the opposite end of the tubular core and into engagement with the second end cap annular sealing surface to thereby prevent further flow of fuel through the filter.

Thus, the filter provides means of positive shutoff and is particularly applicable for use as a fuel filter to provide positive shutoff when the filter has intercepted a preselected quantity of water to thereby avoid the possibility of water flowing past the filter.

A better understanding of the invention will be had by reference to the following description and claims taken in conjunction with the attached drawings.

DESCRIPTION OF THE PREFERRED EMBODIMENT

Figure 1:
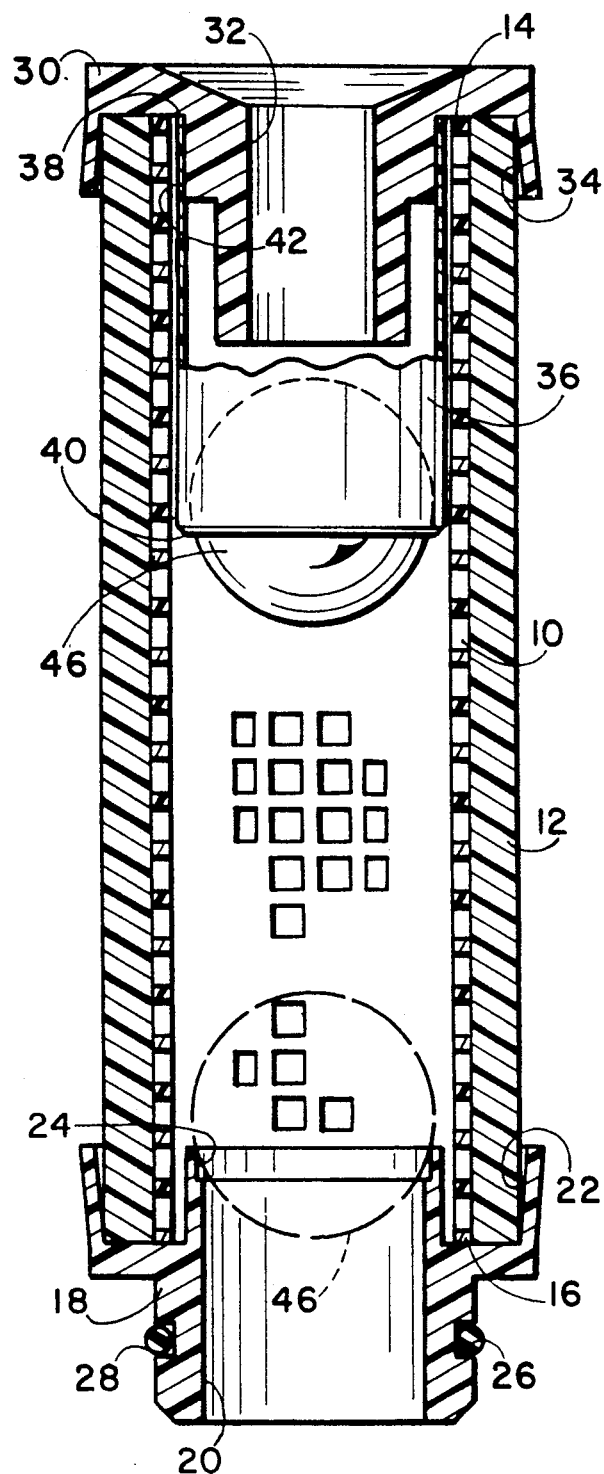
FIG. 1 is an elevational cross-sectional view of a fuel filter that employs the principles of this invention. All the elements of the filter are shown in cross-section except a tubular retention sleeve portion which is shown partially in exterior elevational view and partially broken away to reveal the cross-sectional configuration thereof. A ball member is shown in external elevational view, a substantial portion of the ball member being received within the lower portion of the retention sleeve.

Referring to the drawings and first to FIG. 1, a fuel filter which incorporates the principles of this invention is shown essentially in elevational cross-section view. The fuel filter in FIG. 1 is of the fuel cartridge type, that is, the filter is of the type that is inserted into an opening in a housing. Therefore the filter of FIG. 1 does not include a housing but is of the type which is received in a housing. Fuel to be filtered surrounds the filter element to pass through it and pass out of an opening in the housing (not seen). The filter element is formed of a rigid tubular fuel pervious core member 10 that can be made of metal, such as aluminum, or plastic. Core member 10 has a large number of openings therein through which fluid can freely pass. One purpose of core member 10 is to form a structural base member to which the other elements of the filter are attached.

Surrounding core member 10 is a flexible filter media 12. Filter media 12 has two basic functions. The first is to intercept from the flow of fluid therethrough any particulate matter. Such particulate matter can be any solid substance such as dirt, sand, rust or any other physical element that could interfere with the flow of fuel in a mechanism, such as jet aircraft engines or the like. The second function of flexible filter media 12 is to intercept water. For reference to a filter media that has the characteristics of freely permitting the passage of fuel therethrough but which absorbs and thereby resists the flow of water, see U.S. Pat. No. 4,787,949 entitled "Method of Manufacturing Highly Water Absorbent Pleated Filter Laminate". This patent was granted to Frederic W. Cole et al on Nov. 29, 1988. Other types of water absorbent flexible filter media are known and the type that is used in this invention may be any type which functions to permit the free passage of fuel therethrough but which intercepts particulate matter and water.

Core member 10 has a first end 14 and a second end 16. Affixed at the second end 16 of the core member is a second end cap 18 that can be made of metal but is preferably of molded plastic. Second end cap 18 has a flow passageway 20 therethrough. The second end cap is further defined by an annular recess 22 that receives the lower end 16 of core member 10 and the lower end portion of the flexible filter media 12. The core member and flexible filter media are bonded to second end cap 18 by means of an adhesive bonding material.

Formed at the upper end of second end cap 18 is a circumferential sealing surface 24.

A circumferential external groove 26 receives an o-ring 28 so that the second end cap may be sealably plugged into a flow passageway opening (not shown) within the vessel (not shown) in which the filter is used.

Secured to the upper end 14 of core member 12 is a first end cap 30 that has a bored pressure port passageway 32 therethrough. The first end cap 30 has, as was described with reference to the second end cap, an annular recess 34 that sealably receives the upper end 14 of core member 10 and the upper end of flexible filter media 12.

Received within core member 10 at the upper end 14 is a tubular retention sleeve 36. This sleeve is preferably formed of thin deformable material such as metal or stiff plastic. Sleeve 36 has an upper end 38 and a lower end 40. Sleeve upper end 38 is secured within the upper end of core member 10. The upper end 38 of tubular retention sleeve 36 is received within the annular recess 34 of first end cap 30. The tubular retention sleeve is in closed communication with the end cap—that is, the flow passageway 32 is in closed communication with the tubular retention sleeve 36. First end cap 30 has an internal circumferential surface 42 that forms a part of the annular recess 34. The upper portion of tubular retention sleeve 36 is bonded to the first end cap circumferential surface 42 so that tubular retention sleeve 36 is held in coaxial alignment with pressure port passageway 32.

Figure 2:
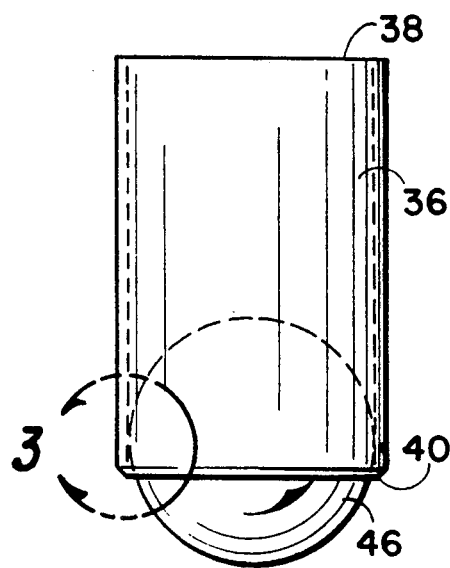
FIG. 2 is an elevational view of the retention sleeve showing the ball, partially in dotted outline, as received within the sleeve.
Figure 3:
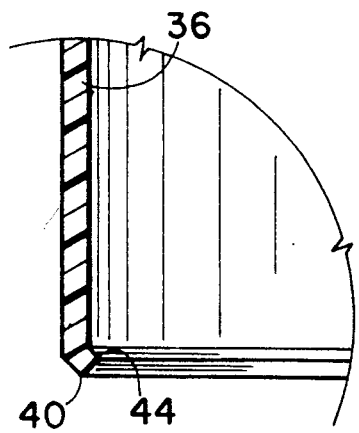
FIG. 3 is an enlarged fragmentary view of the lower end of the retention sleeve showing the integral seat having a reduced internal diameter.

Tubular retention sleeve 36 is illustrated in FIGS. 2 and 3. As best seen in FIG. 3, the tubular retention sleeve has an integral circumferential ball retention seat 44 of reduced internal diameter. As shown in FIGS. 1 and 2, a ball 46 is normally positioned within sleeve 36. Ball 46 is of an external diameter just slightly less than the internal diameter of sleeve 46 so that the ball fits snugly but slideably within the sleeve. Ball 46 is of external diameter slightly greater than the internal diameter of ball retention seat 44 so that ball 46 is normally held in sealed engagement with seat 44, the ball being held in such position by the pressure differential existing across the filter as fuel flows through flexible filter media 12 and into core member 10. The fuel normally flows freely out through the flow passageway 20 in the second end cap 18.

When filter media 12 has absorbed a quantity of water the resistance to flow of fuel through the filter media increases. When the resistance to fuel flow has increased to a selected level, causing a selected pressure differential to exist across the filter, which pressure differential is applied to ball 46 in its sealed position within the tubular retention sleeve 36, ball 46 is forced past ball retention seat 44. This is accomplished by the slight elastic radial expansion of the sleeve 36 at the lower end 40. When the pressure differential has caused the ball 46 to be displaced from the sleeve, the fluid flow immediately causes the ball to move to second end cap 18 and to seat against circumferential sealing surface 24 as shown by the ball positioned in dotted outline in FIG. 1. When in the position as indicated in the dotted outline in FIG. 1, flow of fluid through second end cap 18 is blocked and thus fluid flow can no longer take place through the filter element. The movement of ball 46 from its normal position within tubular retention sleeve 36 to the closed position against sealing surface 24 serves to positively shutoff further fluid flow through the filter.

Thus the filter described herein has improved means of positive shutoff to close against further fluid flow when the filter has absorbed a quantity of water to thereby ensure that water does not pass into the fluid stream flowing through flow passageway 20.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A filter having improved means of positive shutoff comprising:
   a rigid tubular fuel pervious core member having a first end and a second end;
   flexible filter media surrounding said tubular core member through which fuel freely passes from the exterior thereof into said tubular core member but which resists the passage of particulate matter and water;
   an elongated thin wall tubular retention sleeve received co-axially and entirely within and in closed communication with said tubular core member at said first end thereof, the retention sleeve having a first end and a second end and having an integral circumferential ball retention seat of reduced internal diameter at said sleeve second end;
   an end cap secured to said tubular core member at said second end thereof having an opening therethrough in closed communication with said tubular core member second end, and having an annular sealing surface surrounding said opening therethrough; and
   a ball within said filter and normally within said tubular retention sleeve and in sealed engagement with said circumferential ball retention seat as fuel flows through said filter media and into said tubular core member and out through said end cap, said tubular retention sleeve being radially outwardly deformable to permit said ball to pass said retention seat when a predetermined pressure drop develops across said flexible filter media to thereby cause said ball to engage said annular sealing surface of said end cap to block further flow through the filter.

2. A filter having improved means of positive shutoff according to claim 1 wherein said end cap secured to said core member at said second end is a second end cap and further including:
   a first end cap having a pressure port opening therethrough and being secured to said tubular core member at said first end thereof.

3. A filter having improved means of positive shutoff according to claim 2 wherein said retention sleeve first end is secured to said first end cap coaxially with said pressure port opening.

4. A filter having improved means of positive shutoff according to claim 1 wherein said retention sleeve is formed of relatively thin, deformable metal or plastic material.

5. A filter having improved means of positive shutoff according to claim 1 wherein said flexible filter media resists the passage of particulate matter.

6. A filter having improved means of positive shutoff according to claim 1 wherein said flexible filter media resists the passage of water.

7. A filter having improved means of positive shutoff according to claim 1 wherein said flexible filter media resists the passage of both particulate matter and water.

8. A filter having improved means of positive shutoff according to claim 1 wherein the internal diameter of said tubular retention sleeve is only slightly greater than the diameter of said ball whereby said ball fits snugly but movably within said retention sleeve.

9. A filter having improved means of positive shutoff comprising:

a rigid tubular fuel pervious core member having a first end and a second end;

a first end cap secured to said core member first end and having a pressure port opening therethrough;

flexible filter media surrounding said tubular core member through which fuel freely passes from the exterior thereof into said tubular core member but which resists the passage of particulate matter and water;

an elongated thin wall tubular retention sleeve secured to said first end cap coaxially with said pressure port opening and being received co-axially and entirely within and in closed communication with said tubular core member at said first end thereof, the retention sleeve having a first end and a second end and having an integral circumferential ball retention seat of reduced internal diameter at said sleeve second end;

a second end cap secured to said tubular core member at said second end thereof having an opening therethrough in closed communication with said tubular core member second end, and having an annular sealing surface seat surrounding said opening therethrough; and a ball within said filter and normally within said tubular retention sleeve and in sealed engagement with said circumferential ball retention seat as fuel flows through said filter media and into said tubular core member and out through said second end cap, said tubular retention sleeve being radially outwardly deformable to permit said ball to pass said retention seat when a predetermined pressure drop develops across said flexible filter media to thereby cause said ball to engage said annular sealing surface of said second end cap to block further flow through the filter.

* * * * *